United States Patent
Li

(10) Patent No.: US 6,236,406 B1
(45) Date of Patent: May 22, 2001

(54) THREE-DIMENSIONAL COLOR SPACE DISPLAY

(75) Inventor: Zhuoning Li, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/176,612

(22) Filed: Oct. 21, 1998

(51) Int. Cl.$^7$ .................................................. G06T 11/40
(52) U.S. Cl. ........................... 345/431; 345/426; 345/427
(58) Field of Search ................................... 345/431, 426, 345/432, 155, 199, 150, 418, 425, 427; 358/522, 523, 527; 703/8, 6; 434/44; 348/642, 649, 650, 655, 727, 728

(56) References Cited

U.S. PATENT DOCUMENTS

| | | | |
|---|---|---|---|
| 4,739,407 | 4/1988 | Mack et al. | 358/188 |
| 5,049,986 | * 9/1991 | Aono et al. | 358/522 |
| 5,363,477 | * 11/1994 | Kuragano et al. | 345/426 |
| 5,384,719 | * 1/1995 | Baker et al. | 703/8 |
| 5,432,893 | * 7/1995 | Blasubramanian et al. | 345/431 |
| 5,452,370 | 9/1995 | Nagata | 382/153 |
| 5,530,869 | 6/1996 | Salle | 395/700 |
| 5,544,284 | * 8/1996 | Allebach et al. | 345/431 |
| 5,572,727 | 11/1996 | Larsson et al. | 395/616 |
| 5,664,080 | * 9/1997 | Lucas et al. | 345/431 |
| 5,777,620 | * 7/1998 | Billyard | 345/426 |
| 5,794,249 | 11/1998 | Orsolini et al. . | |
| 5,835,099 | * 11/1998 | Marimont | 345/431 |
| 5,915,250 | 6/1999 | Jain et al | 707/100 |
| 5,983,237 | 11/1999 | Jain et al. | 707/104 |
| 5,987,456 | 11/1999 | Ravela et al. | 707/5 |
| 6,016,494 | 1/2000 | Isensee et al. | 707/102 |
| 6,035,055 | 3/2000 | Wang et al. | 382/118 |

OTHER PUBLICATIONS

Bach, Jeffrey R. et al.; The Virage Image Search Engine: An open framework for image management; Virage, Inc.; http//www.virae.com; published Jan. 2, 1996; SPIE vol. 2670; pp. 76–87.

Lemstrom, Kjell, et al.; PICSearch–A Platoform for Image Content–based Searching Algorithms; The Sixth Int. Conf. In Central Europe on Computer Graphics and Visualization, Plzen, 1998.; published Feb. 3, 1998; pp. 222–229.

Orphanoudakis, S.C., et al.; I C: A System for the Indexing, Storage and Retrieval of Medical Images by Content; Institute of Computer Science, Foundation for Research and Technology–Hellas and Department of Computer Science, University of Crete, Heraklion, Crete, Greece; Jan. 1994; published Sep. 30, 1993; pp. 1/18.

International Search Report, PCT/US99/24094.

Ubell, Michael, et al.; Embedding image query operations in an object–relational database management system; Illustra Information Technologies, Inc.; SPIE vol. 2420; published 1995; pp. 197–203.

* cited by examiner

*Primary Examiner*—Jeffery Brier
*Assistant Examiner*—Thu-Thao Havan
(74) *Attorney, Agent, or Firm*—Blakely, Sokoloff, Taylor & Zafman LLP

(57) ABSTRACT

A method of generating a global three-dimensional representation of a color space. Initially, the color elements associated with a color space are quantized. A three-dimensional color space frame model is generated based upon the color space. The quantized color elements are mapped to the three-dimensional color space frame model. Accordingly, perspective parameters are used to manipulate the three-dimensional color space frame model to provide different three-dimensional views of the three-dimensional color space frame model.

20 Claims, 10 Drawing Sheets

(4 of 10 Drawing Sheet(s) Filed in Color)

THREE-DIMENSIONAL COLOR SPACE DISPLAY

FIELD OF THE INVENTION

The present invention relates to the display of color spaces. More specifically, the present invention relates to the three-dimensional display of color spaces.

BACKGROUND

Color may be the one of the most straightforward features utilized by humans for visual recognition and discrimination. The term "color" is often defined by such common terms as hue, saturation (also referred to as chroma), and value (also referred to as intensity or luminance) which are used to represent a particular color space. A color space is merely a representation of the different colors or color elements which comprise the respective color space.

Typically, each color space (or color gamut) is comprised of three elements which define the color space, as such, the three elements constituting the color space define the physical color space representation. Accordingly, there are a number of different theoretical physical color space representations (e.g., cubes, cones, etc.) for each individual color space. For instance, an RGB (red, green, and blue) color space may be theoretically represented as a cube, or more commonly referred to as an RGB cube. Likewise, an HSV (hue, saturation, and value) color space may be theoretically represented as a hexagonal cone, or more commonly referred to as an HSV hexcone.

The usage and representation of different color spaces is very important for those persons engaged in the field of performing color/image comparisons and analysis, such as for example, color comparisons utilized in content based searches. The graphical physical display or representation of various color spaces on a physical display system (e.g., graphic user interface (GUI) or monitor), however, has proposed a dilemma in that the various color spaces are typically represented as two different graphical components or graphical representations. For instance, a typical graphical user interface (GUI) 100, as illustrated in FIG. 1, for the viewing of the HSV color space is represented as two distinct graphical components, a first two-dimensional graphical component 105 that comprises a hue (H) element 110 and a saturation (S) element 115 of the corresponding HSV color space, and a second one-dimensional graphical component 120 that comprises a value (V) element 125 of the corresponding HSV color space.

As such, the currently used graphical representations, illustrated in FIG. 1, fail to provide a global picture of the various color elements within a color space. Moreover, the currently used graphical representations of color spaces fail to illustrate how the different color elements within a particular color space inter-relate to one another. As a result, the current representation of different color spaces on a display medium is very limited, resulting in color/imaging analysis limitations for those persons engaged in the field of color/image comparisons and analysis.

It is therefore desirable to provide graphical representations of color spaces which provide a global picture of the various color spaces used for performing color/image comparisons.

SUMMARY OF THE INVENTION

An embodiment of the present invention provides for a method of generating a global three-dimensional representation of a color space. Initially, the color elements associated with a color space are quantized. A three-dimensional color space frame model is generated based upon the color space. The quantized color elements are mapped to the three-dimensional color space frame model. Accordingly, perspective parameters are used to manipulate the three-dimensional color space frame model to provide different three-dimensional views of the three-dimensional color space frame model.

Another embodiment of the present invention provides for a computer readable medium containing executable instructions which, when executed in a processing system, causes the processing system to perform the steps of a method for generating a global three-dimensional representation of a color space. Initially, the color elements associated with a color space are quantized. A three-dimensional color space frame model is generated based upon the color space. The quantized color elements are mapped to the three-dimensional color space frame model. Accordingly, perspective parameters are used to manipulate the three-dimensional color space frame model to provide different three-dimensional views of the three-dimensional color space frame model.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Generally, the present invention is directed to the global three-dimensional representation of color spaces, and the various color elements that comprise a particular color space.

Although the following description describes one embodiment of the present invention in terms of an HSV color space, it is understood that the HSV color space is merely representative of one embodiment of one type of color space in which the present invention may be described. It is further understood that the inventive aspects of the present invention are not to be limited to such color space, but rather the inventive aspects of the present invention may be applied to a variety of different color spaces, such as, but not limited to, RGB, YcrCb, CIExyY, CIELAB, and other color spaces.

Each color space may be theoretically or mathematically represented as a three-dimensional color space representation of the associated elements which comprise the corresponding color space. Correspondingly, each color space (or color gamut) is comprised of at least three elements which physically define the corresponding color space, as such, the three elements comprising a color space actually define the physical three-dimensional color space representation. Therefore, the three elements comprising a color space may be theoretically or mathematically represented as a physical three-dimensional color space representation of the corresponding color space.

For instance, an HSV color space is comprised of three unique elements, a hue element, a saturation element, and a value element, which may be represented as a corresponding physical three-dimensional color space representation. Accordingly, the respective elements comprising the HSV color space actually define the HSV color space as a physical three-dimensional color space representation of an HSV hexcone. Likewise, an RGB color space is comprised of three elements, a red color element, a green color element, and a blue color element, which may be represented as a corresponding physical three-dimensional color space representation. Accordingly, the respective elements comprising the RGB color space actually define the RGB color space as a physical three-dimensional color space representation of an RGB cube. Therefore, the three elements which constitute a particular color space actually define the physical three-dimensional color space representation (e.g., hexcone, cube, double inverted cone, etc.) associated with the respective color space (e.g., HSV, RGB, HSL, etc.).

Figure 2:
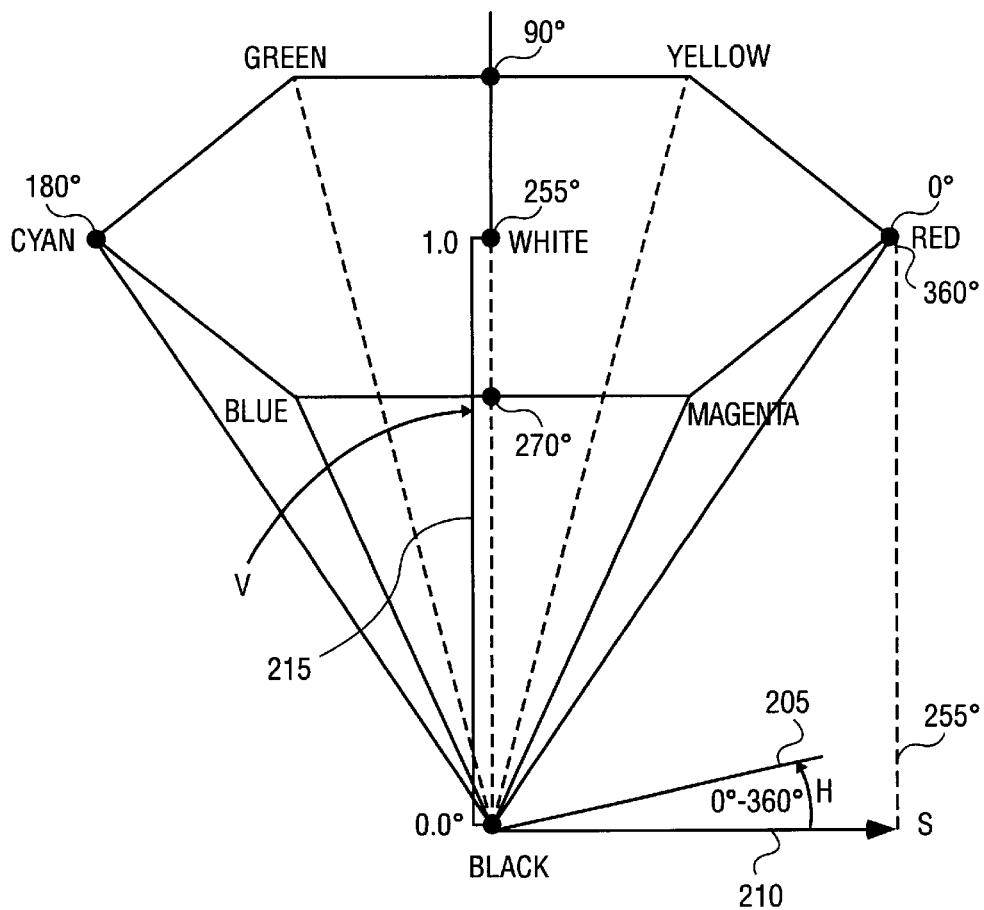
FIG. 2 illustrates an embodiment of a schematic or mathematical representation of a three-dimensional physical color space representation of an HSV color space in accordance with the teachings of one embodiment of the present invention.

As mentioned above, the HSV color space is comprised of three elements, a hue element, a saturation element, and a value element which may be represented as a corresponding three-dimensional physical color space representation of an HSV hexcone. FIG. 2 illustrates an example of a schematic or mathematical representation of a three-dimensional physical color space representation of an HSV hexcone 200 corresponding to an HSV color space, along with the three individual elements (hue element 205, saturation element 210, and value element 215) which comprise the HSV color space.

Each of the three elements which comprise the HSV color space hexcone 200 represent a unique color aspect of the corresponding color space. For instance, the hue (H) element 205 controls the color spectrum of the color space, for example, from the color red to the color violet. The saturation (S) element 210 controls the purity of each color, for example, the various tones associated with the color blue may have different levels of saturation which range from a dark blue color (fully saturated) to a light blue color (partially saturated) and finally to a white color (non-saturation). Finally, the value (V) element 215, also referred to as a luminance (L) element, controls the brightness or intensity of the individual colors.

Correspondingly, as illustrated in FIG. 2, each of the three elements comprising the HSV color space have a corresponding value range, for instance, the hue (H) element 205 ranges in value from 0 Degrees to 360 Degrees and is measured by the angle around the vertical axis of the hexcone 200. The saturation (S) element 210 ranges in value from 0 Degrees to 255 Degrees and is a ratio rating from 0 Degrees on the centerline or bottom of the hexcone 200 to 255 Degrees on the triangular sides on the top of the hexcone 200. The value (V) element 215 ranges in value from 0 Degrees to 255 Degrees and is a value from 0 Degrees on the bottom center of the hexcone 200 to 255 Degrees on the top center of the hexcone 200.

Figure 3:
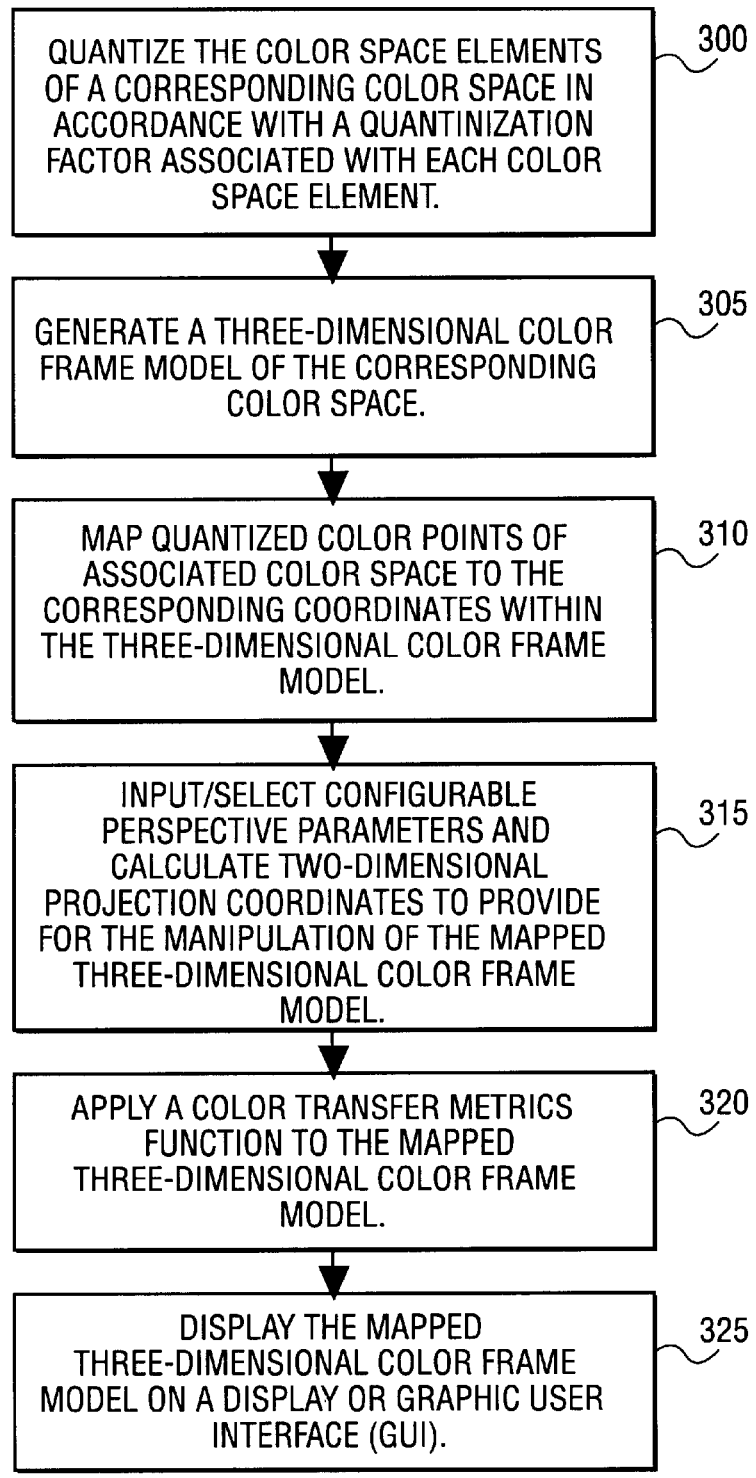
FIG. 3 illustrates a block flow diagram of an embodiment of a method for generating a three-dimensional color space graphical or visual representation of a color space in accordance with the teachings of one embodiment of the present invention.

FIG. 3 is a block flow diagram of an embodiment of a method for generating a three-dimensional color space graphical or visual representation of a color space. Further, the three-dimensional color space graphic representation of a color space is capable of being manipulated to provide different viewing perspectives of the three-dimensional color space graphic representation.

Initially, at Block 300, the respective color space elements of a corresponding color space are quantized in accordance with a configurable quantization factor which is associated with each color space element comprising the color space. Alternately, the respective color space elements of a corresponding color space may be quantized in accordance with a common configurable quantization factor applied to all of the color space elements comprising the color space. Correspondingly, the distributed color spectrum associated with the color space is likewise quantized as a result of quantizing the respective color space elements of the corresponding color space. The configurable quantization factor may be selected or generated by a user, computer program, or other device in accordance with a desired view of the corresponding representative color space.

In another embodiment, only select color space elements of the corresponding color space are quantized in accordance with a configurable quantization factor for the selected color elements of the color space.

Accordingly, in the present embodiment, the respective color space elements of H, S, and V, which correspond to the HSV color space, are quantized in accordance with a configurable quantization factor for each color space element (i.e., Hue, Saturation, and Value) comprising the HSV color space. As such, each corresponding color point associated with a color space may be defined by a three-dimensional coordinate (x, y, z), or set of three-dimensional coordinates (x, y, z), which correspond to the three color elements constituting a particular color space. Therefore, in the present embodiment, each of the color points associated with the HSV color space may be defined by a three-dimensional coordinate (H, S, V), or set of coordinates (H, S, V), which correspond to a particular location in the HSV color space.

As mentioned above, each color space may be represented as a corresponding theoretical or mathematical three-dimensional physical color space representation or model. Further, the color space is comprised of individual color elements which have been quantized into a series of different color points. Therefore, each color point, associated with the HSV color, may be described by a three-dimensional coordinate (H, S, V) which corresponds to a specific location within the HSV color space. As such, each color point corresponds to a three-dimensional point (x, y, z), or alternately (H, S, V), within the theoretical or mathematical three-dimensional physical color space representation of a corresponding color space.

Figure 1:
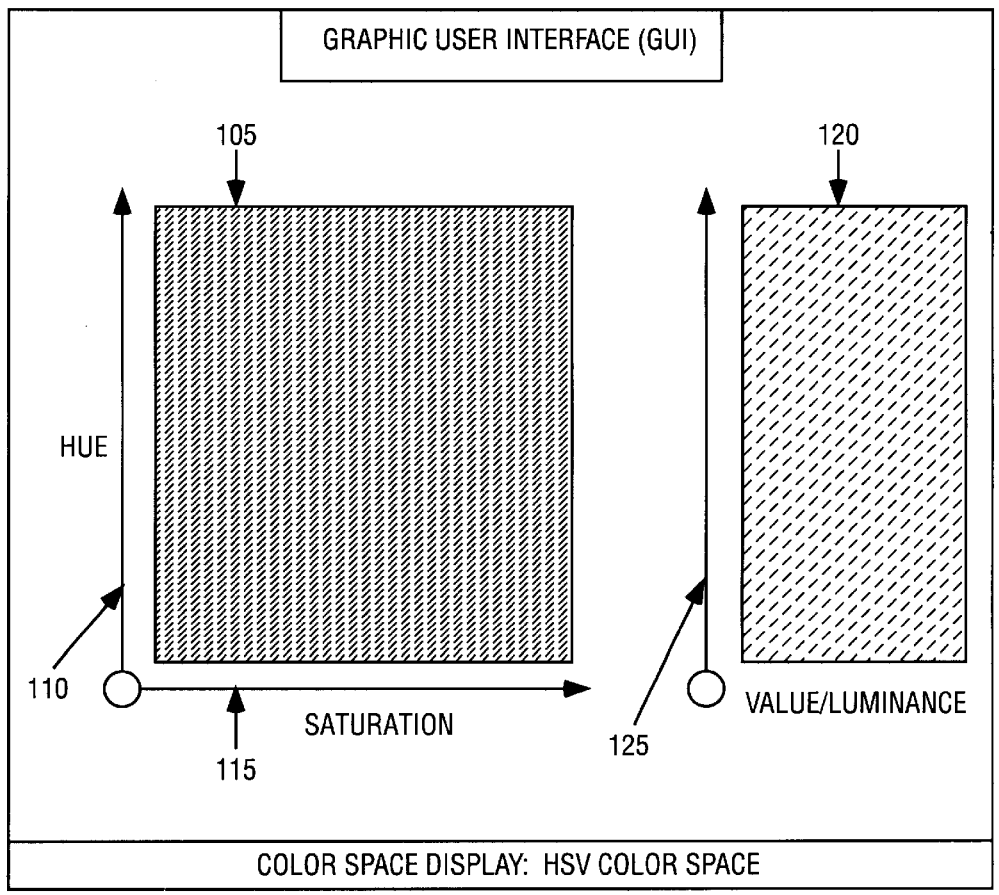
FIG. 1 illustrates a prior art embodiment of a color space representation displayed on a graphic user interface (GUI).

At Block 305, a representative three-dimensional color space frame model of the corresponding color space is generated based upon the color space being quantized. For instance, a three-dimensional color space frame model of a hexcone is generated for the corresponding HSV color space, similar to the HSV hexcone illustrated in FIG. 1. Alternately, if an RGB color space was selected, a corresponding three-dimensional color space frame model of a cube would be generated for the orresponding RGB color space. As such, the three elements comprising a color space define the three-dimensional color space frame model of the corresponding color space.

Accordingly, each color point associated with a particular color space corresponds to a three-dimensional point (x, y, z), or alternately (H, S, V) for the present embodiment, within the three-dimensional color space frame model of the corresponding color space. The three-dimensional color space frame model may be displayed on a standard two-dimensional display or graphics user interface (GUI) utilizing standard planar geometric projections. In another embodiment, the three-dimensional color space frame model may be maintained in a memory for later display on a standard two-dimensional display or graphic user interface (GUI).

Figure 4:
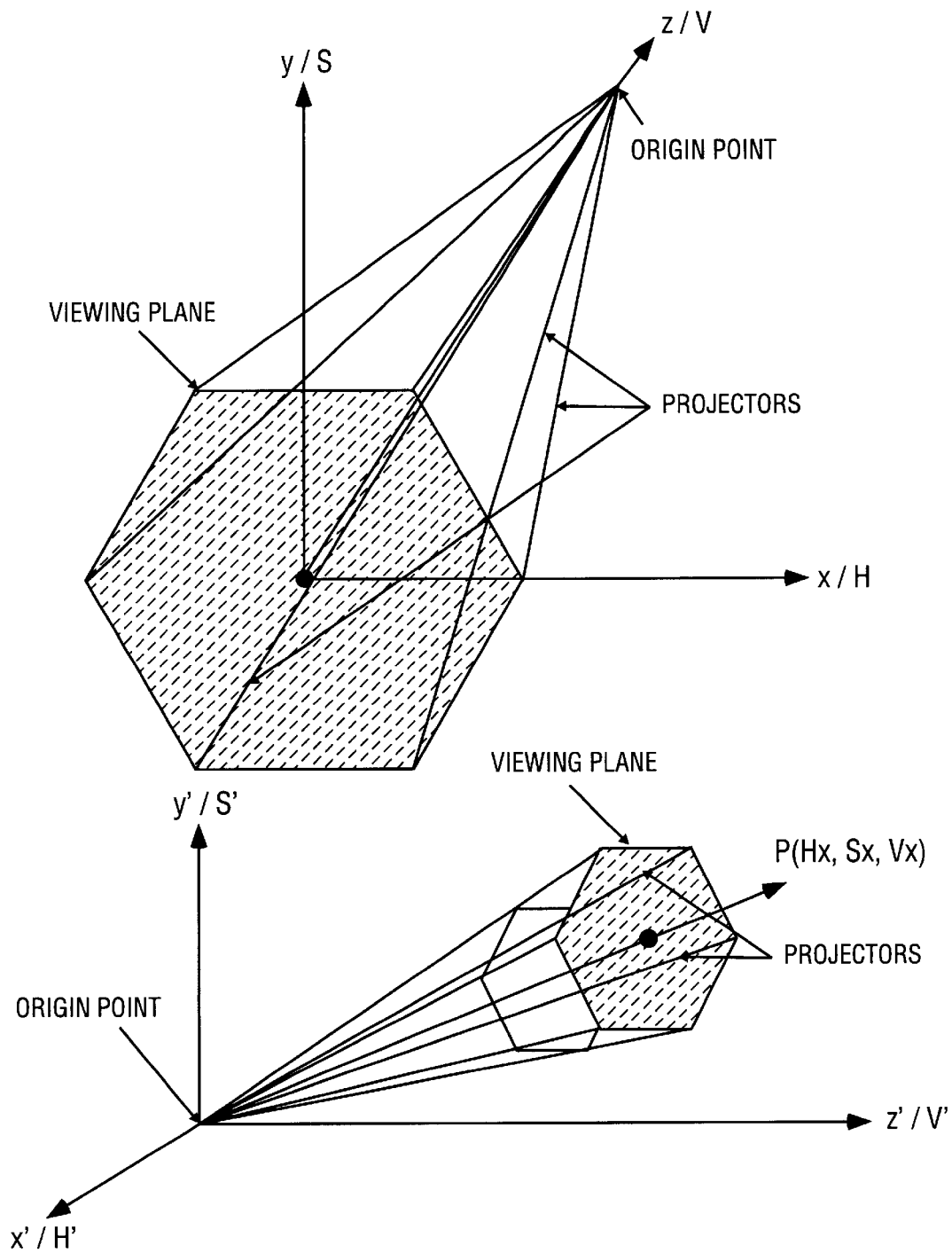
FIG. 4 illustrates an embodiment of a perspective projection of a three-dimensional color space frame model of a hexagon onto a two-dimensional plane in accordance with the teachings of one embodiment of the present invention.

FIG. 4 illustrates an embodiment of a perspective projection of a three-dimensional color space frame model of a hexagon onto a two-dimensional plane (x-y plane) of a viewing medium or display, where the x-y plane defines the viewing plane of the viewing medium or display. Accordingly, the projection of a 3D object is defined by a series of straight projection vectors, or simply projectors, which originate from a center of projection point (origin point). Accordingly, the projectors pass through a series of points (e.g., Hx, Sy, Vz) of the object and intersect a projection plane (x-y plane) to form the three-dimensional projection of a color space (e.g., HSV color space).

At Block 310, the different quantized color points associated with the corresponding color space (e.g., HSV color space) are mapped to corresponding coordinates within the three-dimensional color space rame model of the corresponding color space. As such, the series of coordinates (x, y, z)/(H, S, V) which correspond to the series of different color points associated with a color space are mapped to a standard two-dimensional viewing area of a display.

The three-dimensional color point set of coordinates (e.g., H, S, V) are mapped onto the two-dimensional viewing area of a display through the use of planar geometric projections, which allows objects or data described by three dimensional coordinates to be displayed onto a two-dimensional projection plane. The utilization of projections or planar geometric projections (P) allows for the transformation of points in a coordinate system of dimension N (e.g., 3D) into associated points of a coordinate system of dimensions less than N (e.g., 2D).

As such, the color points described by the three-dimensional color point set of coordinates (e.g., (x, y, z)/(H, S, V)) are mapped to the two-dimensional display of the three-dimensional color space frame model using planar geometric projections, which results in the generation of a mapped three-dimensional color space model of the corresponding color space.

In one embodiment, the mapped three-dimensional color space model is maintained in a memory device for later display on the corresponding two-dimensional display or graphic user interface (GUI).

At Block 315, the method provides for the input of configurable perspective parameters which allows for the manipulation of the mapped three-dimensional color space model of the corresponding color space. In one embodiment, the configurable perspective parameters allow for the mapped three-dimensional color space model of the corresponding color space to be rotated (ROT) about a point or axis, such as for example, about the value/luminance axis (or z-axis). In another embodiment, the configurable perspective parameters allow for the mapped three-dimensional color space model of the corresponding color space to be tilted (TILT) about a point or axis, such as for example, toward or away from a viewers perspective about the saturation axis (or x-axis). In yet another embodiment, the configurable perspective parameters allow for the mapped three-dimensional color space model of the corresponding color space to be both simultaneously rotated (ROT) and tilted (TILT) about a point or axis.

As such, the configurable perspective parameters allow for the manipulation of the mapped three-dimensional color space model of the corresponding color space. As a result, a wide variety of different full global three-dimensional viewing perspectives of the mapped three-dimensional color space model may be accomplished.

In one embodiment, which provides for both the rotation (ROT) and tilt (TILT) of the mapped three-dimensional color space model, a series of perspective calculations are executed to provide for different viewing perspectives of the mapped three-dimensional color space model, in accordance with the different configurable perspective parameters selected. A first Coefficient Function (CF) allows for the calculation of a group of coefficients (f11, f12, f13, f21, f22, f23, f32, f33) based upon the selected configurable perspective parameters, such as rotation angle ('rot') and tilt angle ('tilt'). The group of coefficients (f11, f12, f13, f21, f22, f23, f32, f33) are determined in accordance with the following calculations:

double theta=(float)(rot+90)*3.1415926/180
double phi=(float)tilt*3.1415926/180
double costh=cos(theta)
double sinth=sin(theta)

double cosph=cos(phi)
double sinph=sin(phi)
f11=(float)(-sinth)
f12=(float)(-cosph*costh)
f13=(float)(-sinph*costh)
f21=(float)costh
f22=(float)(-cosph*-sinth)
f23=(float)(-sinph*sinth)
f32=(float)sinph
f33=(float)-cosph Wherein, the double theta value function corresponds to the rotation function (ROT), and the 'rot' value corresponds to the selected rotational angle value. Similarly, the double phi value function corresponds to the tilt function (TILT), and the 'tilt' value corresponds to the selected tilt angle value.

Next, a Transformation function (TF) is used in calculating a series of two-dimensional projection coordinates (*x1, *y2) based upon the three-dimensional color point set of coordinates float x, float y, float z, which in the present example would correspond to the (H, S, V) color point coordinates, according to the display window size (cx and cy) and the rotation (ROT) and tilt (TILT) information as expressed in the coefficients (f11, f12, f13, f21, f22, f23, f32, f33). The series of two-dimensional projection coordinates (*x1, *y2) are determined in accordance with the following calculation, for each x, y, z/H, S, V color point coordinate:

float tmp, xe, xx, yy
float fRatio=(float)((2*cx-8)*(1.414/(cx+cy))
float fview=(float)50*2*cx
float fSize=fView*fRatio
tmp=(float)fView/(x*f13+y*f23+z*f33+fSize)
xe=x*f11+y*f21
yy=(float)((float)x*f12+y*f22+z*f32*tmp)
xx=xe*tmp
*y1=(int)yy
*x1=(int)xx Wherein, 'tmp' represents a temporary variable value; 'x', 'y' and 'z' represent the color point coordinates; (cx) and (cy) represent the dimensions of the graphics display area window; and '*x1' and '*y2' represent the two-dimensional projection coordinates corresponding to the selected rotational angle value and selected tilt angle value.

It is understood that the above calculations are merely illustrative of one embodiment of a technique for generating two dimensional projection coordinates (e.g., '*x1' and '*y2') in accordance with one embodiment of manipulation parameters used for manipulating the viewing perspective of a mapped three-dimensional color space model. Further, it is understood that a variety of different manipulation parameters could be use to manipulate the mapped three-dimensional color space model of a corresponding color space. As such, the above calculation is for illustrative purposes and is not meant to limit the present invention to the specific calculations or technique used above for the manipulation of the viewing perspectives of a mapped three-dimensional color space model.

The two-dimensional projection coordinates ('*x1' and '*y2') allow for the manipulation of the mapped three-dimensional color space model in response to the selected rotational angle value and selected tilt angle value. Accordingly, the two-dimensional projection coordinates ('*x1' and '*y2') manipulate the mapped three-dimensional color space model by establishing two-dimensional projection coordinates for each of the color points which have been previously mapped to the three-dimensional color space model.

Accordingly, each color point contained in the mapped three-dimensional color space model is plotted to the new two-dimensional projection coordinates associated with each particular color point. Therefore, the entire mapped three-dimensional color space model is shifted to the new two-dimensional projection coordinates calculated for each color point. As a result, different perspective views of the mapped three-dimensional color space model are provided. It is understood that this process may be repeated with different perspective parameters in order to obtain differing perspective views of the mapped three-dimensional color space model.

Alternately, in the embodiment wherein the mapped three-dimensional color space model has been maintained in a memory device for later display on the corresponding two-dimensional display or graphic user interface (GUI), each color point contained in the mapped three-dimensional color space model maintained in memory is modified (e.g., plotted) to the new two-dimensional projection coordinates associated with each particular color point. Therefore, the entire mapped three-dimensional color space model is shifted in memory to the new two-dimensional projection coordinates calculated for each color point. As a result, different perspective views of the mapped three-dimensional color space model are provided. It is understood that this process may be repeated with different perspective parameters in order to obtain differing perspective views of the mapped three-dimensional color space model.

In another embodiment, the mapped three-dimensional color space model of a corresponding color space may be manipulated in order to provided for a distance perspective, wherein the mapped three-dimensional color space model may be manipulated to appear either closer to, or further from a user's perspective of the viewing plane or surface of the display.

At Block 320, a color transfer metrics function may be applied to the mapped three-dimensional color space model which converts the color spectrum or scheme associated with the mapped three-dimensional color space model to a display color spectrum or scheme supportable by a display. For instance, in the present embodiment, the color spectrum associated with the HSV mapped three-dimensional color space model may be converted into an RGB color spectrum in order to be displayed onto a standard RGB display. As such, the transfer function may be a standard color transfer function which simply converts one color spectrum to another color spectrum Finally, at Block 325, provided the mapped three-dimensional color frame model is not currently being displayed on a display (i.e., the mapped three-dimensional color frame model maintained in memory), the mapped three-dimensional color frame model may be displayed on a graphic interface unit (GUI), such as for example a standard computer monitor or display.

Figure 5:
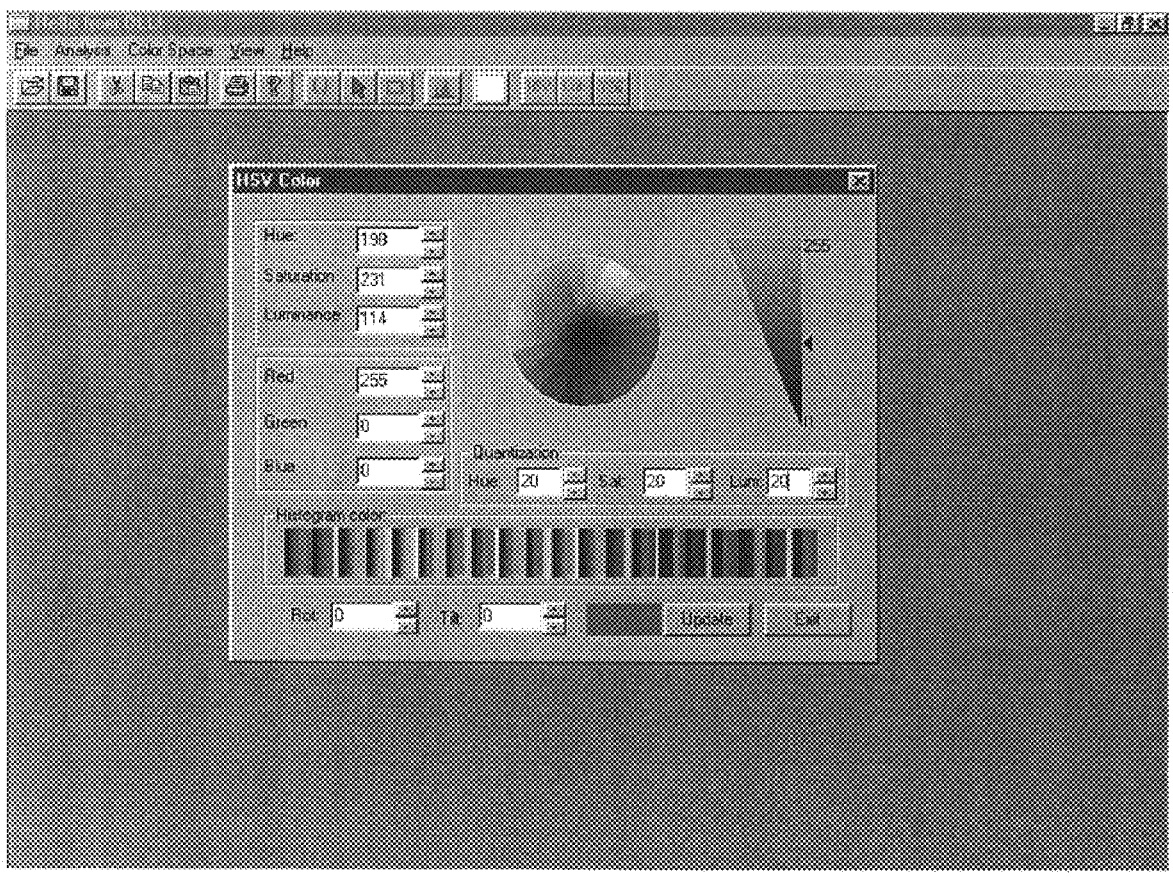
FIG. 5 illustrates an embodiment of a color representation of one embodiment of a mapped three-dimensional color space model corresponding to an HSV color space, displayed on a graphical user interface (GUI), in accordance with the teachings of one embodiment of the present invention.

FIG. 5 illustrates a color representation of one embodiment of a mapped three-dimensional color space model corresponding to an HSV color space, displayed on a graphical user interface (GUI), wherein a common quantization factor is selected for each of the three elements (H, S, and V) comprising the HSV color space.

For instance, in the example of FIG. 5, a quantization factor of twenty (20) is selected for the hue (H) element value, which ranges value from 0 Degrees to 360 Degrees. Accordingly, the hue (H) element is adjusted by the quantization factor of twenty (20). As such, the hue (H) element value is adjusted by dividing the hue element (H), in accordance with quantization factor (20), into twenty (20) different hue (H) color points, each hue (H) color point having a corresponding hue (H) color point size. The hue (H) color point size is determined by dividing the hue range (0 Degrees to 360 Degrees) by the quantization factor (20), in order to determine hue (H) color point size, or expressed alternately, 360/20=18, where the result (18) represents the hue (H) color point size. Accordingly, the twenty (20) different hue (H) color points may be expressed alternately as (0*18, 1*18, 2*18, 3*18, . . . , 19*18, and 20*18). As such, a quantization factor of (20) for the hue (H) element value translates into 20 different color points being generated for the hue (H) element.

Likewise, in the example of FIG. 5, a quantization factor of twenty (20) is selected for the saturation (S) element value, which ranges in value from 0 Degrees to 255 Degrees. Accordingly the saturation (S) element is adjusted by the quantization factor of twenty (20). As such, the saturation (S) element value is adjusted by dividing the saturation element (S), in accordance with quantization factor (20), into twenty (20) different saturation (S) color points, each saturation (S) color point having a corresponding saturation (S) color point size. The saturation (S) color point size is determined by dividing the saturation range (0 Degrees to 255 Degrees) by the quantization factor (20), in order to determine saturation (S) color point size, or expressed alternately, 255/20=12.75, where the result (12.75) represents the saturation (S) color point size. Accordingly, the (20) different saturation (S) color points may be expressed alternately as (0*12.75, 1*12.75, 2*12.75, 3*12.75, . . . , 19*12.75, and 20*12.75). As such, a quantization factor of (20) for the saturation (S) element value translates into 20 different color points being displayed for the saturation (S) element.

With respect to the value (V) element, represented as a luminance (L) element in the embodiment of FIG. 5, a quantization factor of twenty (20) is selected for the luminance (L) element value, which ranges in value from 0 Degrees to 255 Degrees. Accordingly, the luminance (L) element value is adjusted by the quantization factor of twenty (20). As such, the luminance (L) element value is adjusted by dividing the luminance (L) element, in accordance with quantization factor (20), into twenty (20) different luminance (L) color points, each luminance (L) color point having a corresponding luminance (L) color point size. The luminance (L) color point size is determined by dividing the luminance/value range (0 Degrees to 255 Degrees) by the quantization factor (20), in order to determine luminance (L) color point size, or expressed alternately, 255/20=12.75, where the result (12.75) represents the luminance (L)/value (V) color point size. Accordingly, the twenty (20) different luminance (L) color points may be expressed alternately as 0*12.75, 1*12.75, 2*12.75, 3*12.75, . . . , 19*12.75, and 20*12.75). As such, a quantization factor of (20) for the value (V)/luminance (L) element value translates into 20 different color points being displayed for the luminance (L)/value (V) element.

Figure 6:
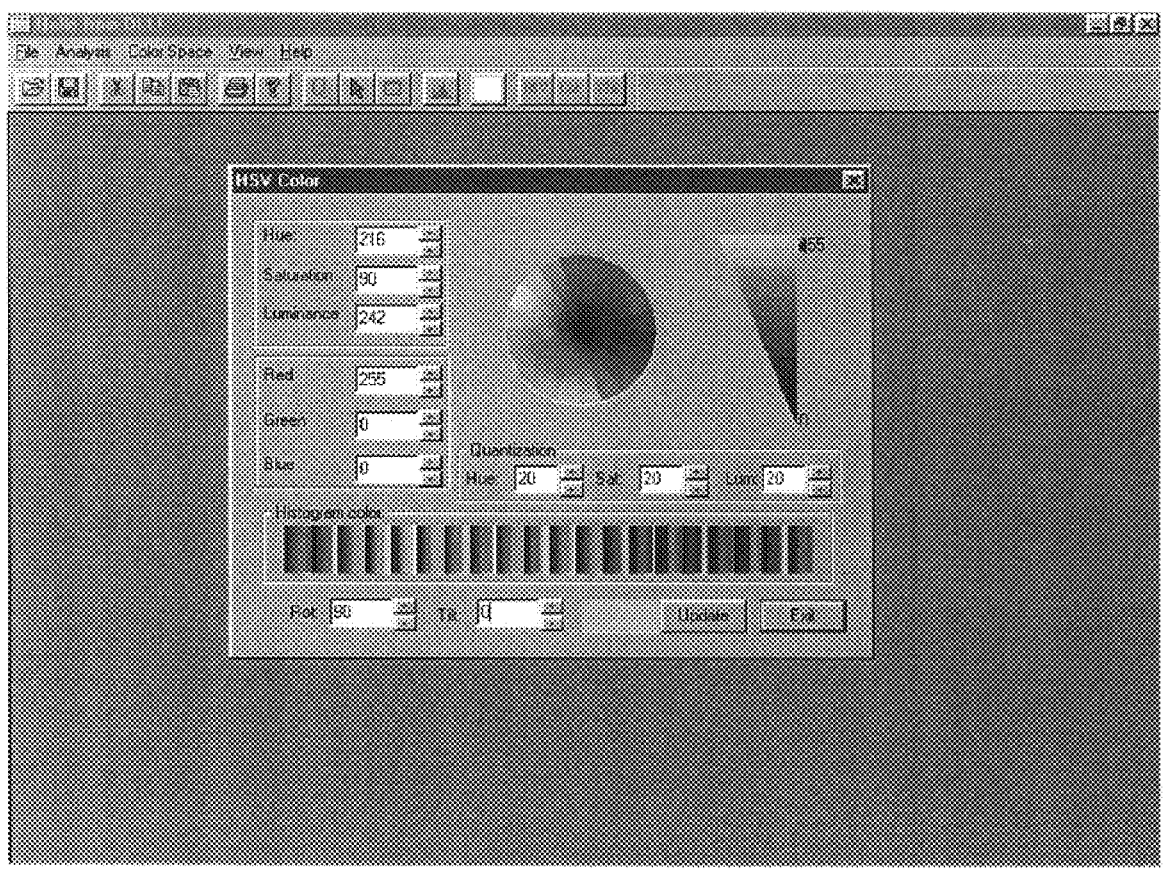
FIG. 6 illustrates another embodiment of the color representation of the mapped three-dimensional color space model as embodied in FIG. 5, in accordance with the teachings of one embodiment of the present invention.

FIG. 6 illustrates the embodiment of the mapped three-dimensional color space model corresponding to an HSV color space of FIG. 5, wherein the mapped three-dimensional color space model has been rotated (ROT) about the value/luminance axis (or z-axis) by an amount of ninety (90) Degrees from the initial location illustrated in FIG. 5 in response to the selected perspective parameter.

Figure 7:
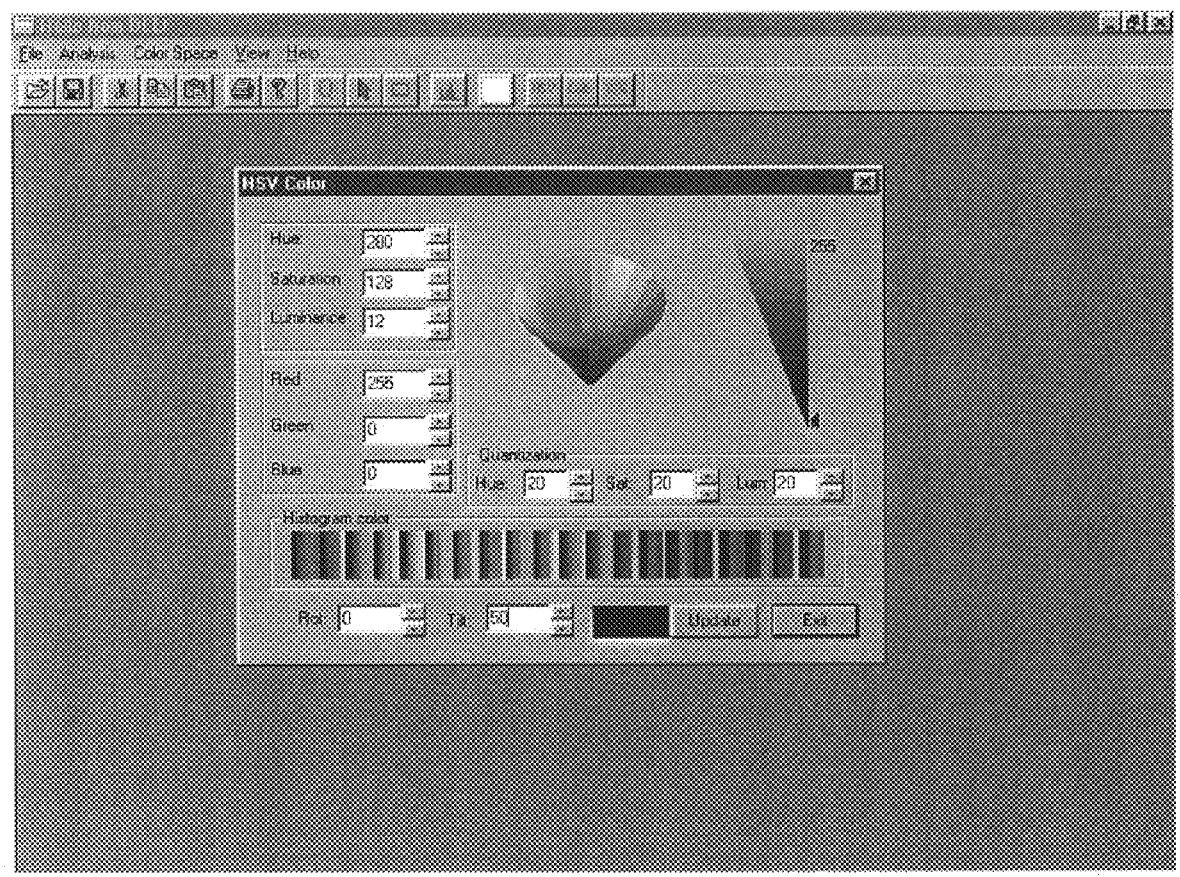
FIG. 7 illustrates yet another embodiment of the color representation of the mapped three-dimensional color space model as embodied in FIG. 5, in accordance with the teachings of one embodiment of the present invention.

FIG. 7, illustrates the embodiment of the mapped three-dimensional color space model corresponding to an HSV color space of FIG. 5, wherein the mapped three-dimensional color space model has been tilted (TILT) toward the viewers perspective about the saturation axis (or x-axis) by an amount of fifty (50) Degrees from the initial location illustrated in FIG. 5 in response to the selected perspective parameter.

Figure 8:
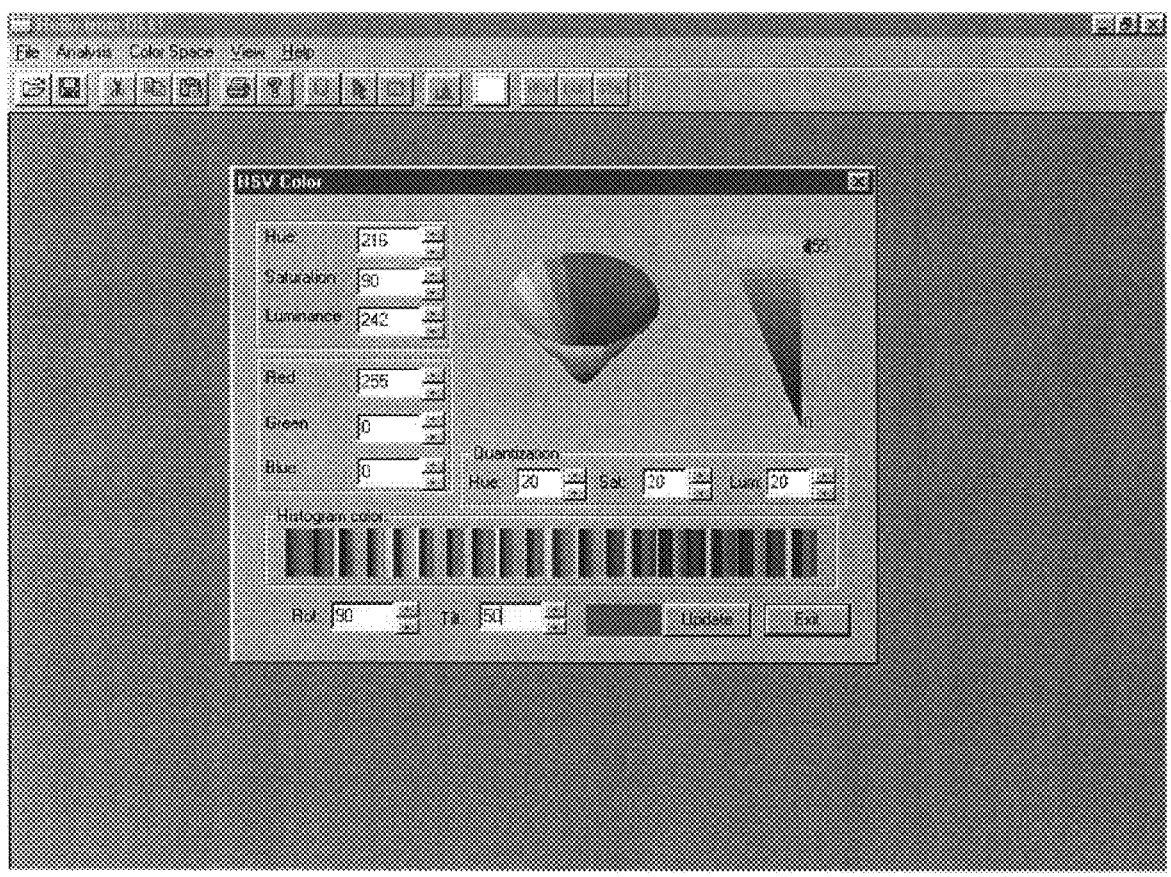
FIG. 8 illustrates a further embodiment of the color representation of the mapped three-dimensional color space model as embodied in FIG. 5, in accordance with the teachings of one embodiment of the present invention.

FIG. 8 illustrates the embodiment of the mapped three-dimensional color space model corresponding to an HSV color space of FIG. 5, wherein the mapped three-dimensional color space model has been rotated (ROT) about the value/luminance axis (or z-axis) by an amount of ninety (90) Degrees from the initial location illustrated in FIG. 5, and tilted (TILT) toward the viewers perspective about the saturation axis (or x-axis) by an amount of fifty (50) Degrees from the initial location illustrated in FIG. 5 in response to the selected perspective parameters.

Figure 9:
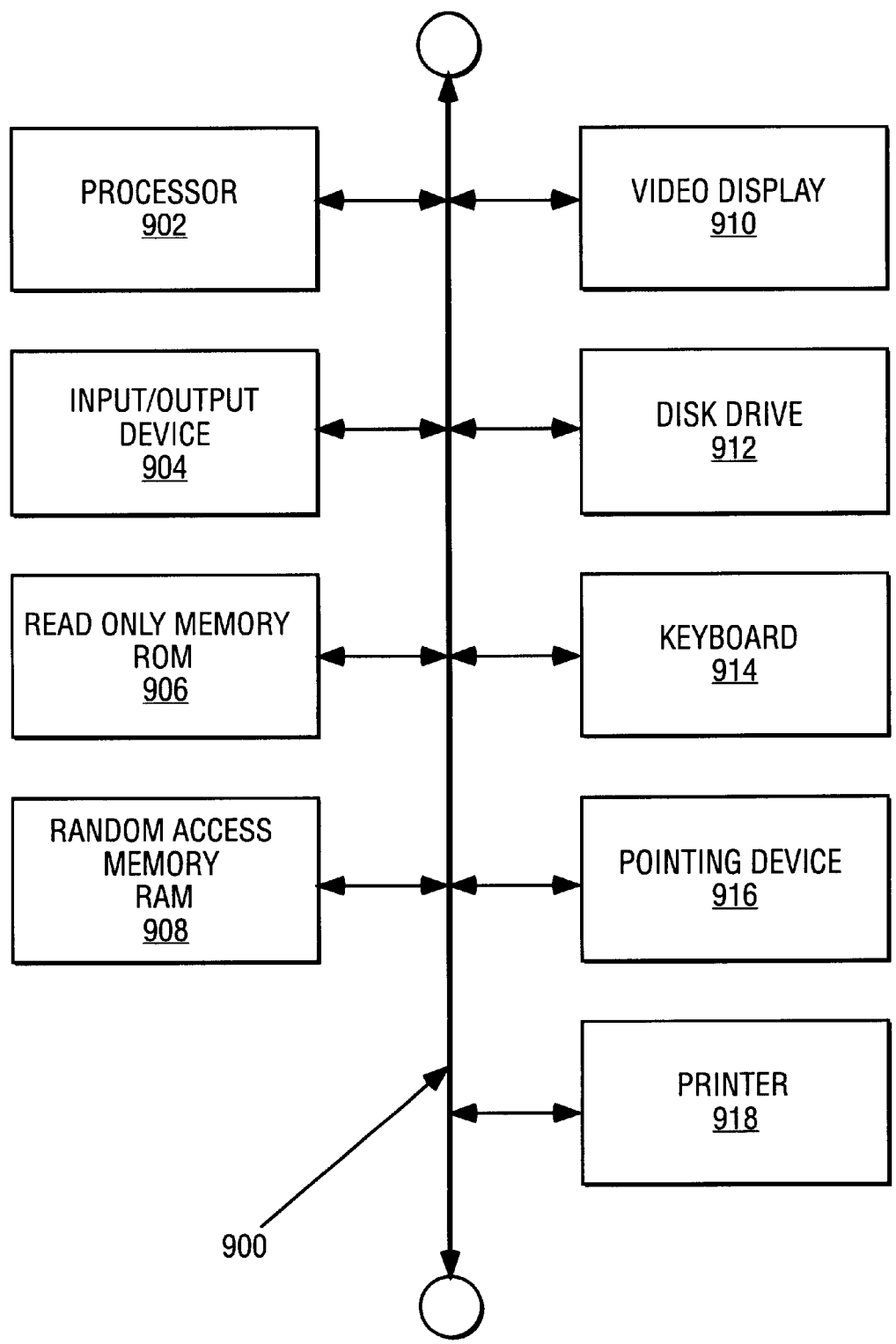
FIG. 9 illustrates an embodiment of computer system that can be used with the present invention in accordance with the teachings of one embodiment of the present invention.

FIG. 9 illustrates an embodiment of a computer system that can be used with the present invention. The various components shown in FIG. 9 are provided by way of example. Certain components of the computer in FIG. 9 can be deleted for a particular implementation of the invention. The computer shown in FIG. 9 may be any type of computer including a general purpose computer.

FIG. 9 illustrates a system bus 900 to which various components are coupled. A processor 902 performs the processing tasks required by the computer. Processor 902 may be any type of processing device capable of implementing the steps necessary to perform the addressing and delivery operations discussed above. An input/output (I/O) device 904 is coupled to bus 900 and provides a mechanism for communicating with other devices coupled to the computer. A read-only memory (ROM) 906 and a random access memory (RAM) 908 are coupled to bus 900 and provide a storage mechanism for various data and information used by the computer. Although ROM 906 and RAM 908 are shown coupled to bus 900, in alternate embodiments, ROM 906 and RAM 908 are coupled directly to processor 902 or coupled to a dedicated memory bus (not shown).

A video display 910 is coupled to bus 900 and displays various information and data to the user of the computer. A disk drive 912 is coupled to bus 900 and provides for the long-term mass storage of information. Disk drive 912 may be used to store various profile data sets and other data generated by and used by the addressing and delivery system. A keyboard 914 and pointing device 916 are also coupled to bus 900 and provide mechanisms for entering information and commands to the computer. A printer 918 is coupled to bus 900 and is capable of creating a hard-copy of information generated by or used by the computer.

Figure 10:
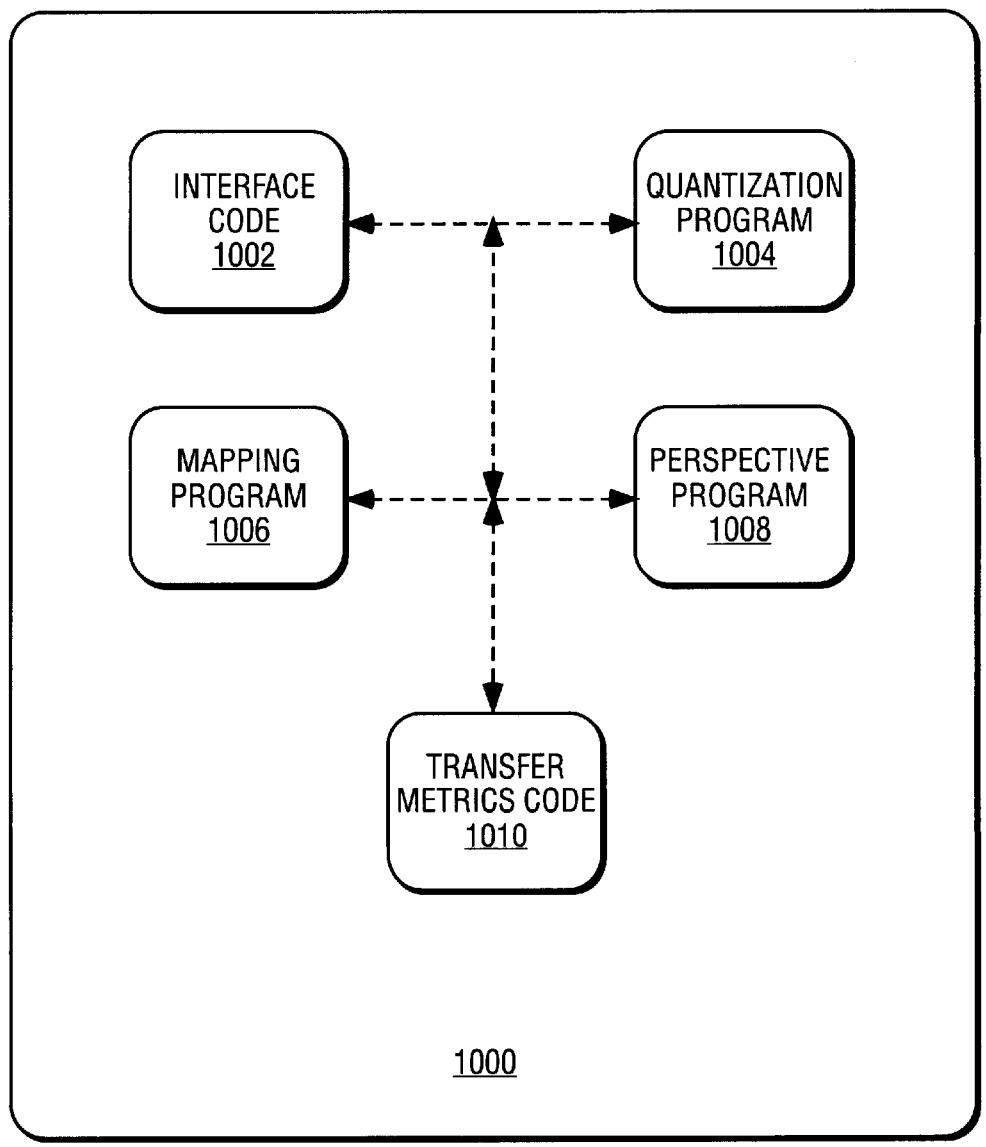
FIG. 10 illustrates an embodiment of a computer-readable medium that may be used by a computer or other processing device in accordance with the teachings of one embodiment of the present invention.

FIG. 10 illustrates an embodiment of a computer-readable medium 1000 containing various sets of instructions, code sequences, configuration information, and other data used by a computer or other processing device. The embodiment illustrated in FIG. 10 is suitable for implementing the graphical representation of different color spaces as described above. The various information stored on medium 1000 is used to perform various data processing operations. Computer-readable medium 1000 is also referred to as a processor-readable medium. Computer-readable medium 1000 can be any type of magnetic, optical, or electrical storage medium including a diskette, magnetic tape, CD-ROM, memory device, or other storage medium.

Computer-readable medium 1000 includes interface code 1002 that controls the flow of information between various devices or components which may be used for generating a three-dimensional graphic or visual representation of a color space. Interface code 1002 may control the transfer of information within a device (e.g., between the processor and a memory device), or between an input/output port and a storage device. Additionally, interface code 1002 may control the transfer of information from one device to another.

Computer-readable medium 1000 also includes a quantization program 1004 for quantizing the respective color space elements of a corresponding color space in accordance with a configurable quantization factor which is associated with each color space element comprising the color space. Alternately, the respective color space elements of a corresponding color space may be quantized in accordance with a common configurable quantization factor applied to all of the color space elements comprising the color space. Correspondingly, the distributed color spectrum associated with the color space is likewise quantized as a result of quantizing the respective color space elements of the corresponding color space. The configurable quantization factor may be selected or generated by a user, computer program, or other device in accordance with a desired view of the corresponding representative color space.

In another embodiment, only select color space elements of the corresponding color space are quantized in accordance with a configurable quantization factor for the selected color elements of the color space.

Accordingly, in the present embodiment, the respective color space elements of H, S, and V, which correspond to the HSV color space, are quantized by the quantization program 1004 in accordance with a configurable quantization factor for each color space element (i.e., Hue, Saturation, and Value) comprising the HSV color space. As such, each corresponding color point associated with a color space may be defined by a three-dimensional coordinate (x, y, z), or set of three-dimensional coordinates (x, y, z), which correspond to the three color elements constituting a particular color space. Therefore, in the present embodiment, each of the color points associated with the HSV color space may be defined by a three-dimensional coordinate (H, S, V), or set of coordinates (H, S, V), which correspond to a particular location in the HSV color space.

As mentioned above, each color space may be represented as a corresponding theoretical or mathematical three-dimensional physical color space representation or model. Further, the color space is comprised of individual color elements which have been quantized into a series of different color points. Therefore, each color point, associated with the HSV color, is described by a three-dimensional coordinate (H, S, V) which corresponds to a specific location within the HSV color space. As such, each color point corresponds to a three-dimensional point (x, y, z), or alternately (H, S, V), within the theoretical or mathematical three-dimensional physical color space representation of a corresponding color space.

Next, the quantization program 1004 generates a representative three-dimensional color space frame model of the corresponding color space based upon the type of color space being quantized. For instance, a three-dimensional color space frame model of a hexcone is generated for the corresponding HSV color space, similar to the HSV hexcone illustrated in FIG. 1. Alternately, if an RGB color space was selected, a corresponding three-dimensional color space frame model of a cube would be generated for the corresponding RGB color space. As such, the three elements comprising a color space define the three-dimensional color space frame model of the corresponding color space.

Accordingly, each color point associated with a particular color space corresponds to a three-dimensional point (x, y, z), or alternately (H, S, V) for the present embodiment, within the three-dimensional color space frame model of the corresponding color space. The three-dimensional color space frame model may be displayed on a standard two-dimensional display or graphics user interface (GUI) utilizing standard planar geometric projections. In another embodiment, the three-dimensional color space frame model may be maintained in a memory for later display on the standard two-dimensional display or graphics user interface (GUI).

A mapping program 1006, then maps the different quantized color points associated with the corresponding color space (e.g., HSV color space) to the corresponding coordinates within the three-dimensional color space frame model of the corresponding color space. As such, the series of coordinates (x, y, z)/(H, S, V) which correspond to the series of different color points associated with a color space are mapped to a standard two-dimensional viewing area of a display.

The three-dimensional color point set of coordinates (e.g., H, S, V) are mapped onto the two-dimensional viewing area of a display through the use of planar geometric projections, which allows objects or data described by three dimensional coordinates to be displayed onto a two-dimensional projection plane. The utilization of projections or planar geometric projections (P) allows for the transformation of points in a coordinate system of dimension N (e.g., 3D) into associated points of a coordinate system of dimensions less than N (e.g., 2D).

As such, the color points described by the three-dimensional color point set of coordinates (e.g., (x, y, z)/(H, S, V)) are mapped to the two-dimensional display of the three-dimensional color space frame model using planar geometric projections, which results in the generation of a mapped three-dimensional color space model of the corresponding color space.

In one embodiment, the mapped three-dimensional color space model is maintained in a memory device for later display on the corresponding two-dimensional display or graphic user interface (GUI).

A perspective program 1008 provides for the input of configurable perspective parameters which allows for the manipulation of the mapped three-dimensional color space model of the corresponding color space. In one embodiment, the configurable perspective parameters allow for the mapped three-dimensional color space model of the corresponding color space to be rotated (ROT) about a point or axis, such as for example, about the value/luminance axis (or z-axis). In another embodiment, the configurable perspective parameters allow for the mapped three-dimensional color space model of the corresponding color space to be tilted (TILT) about a point or axis, such as for example, toward or away from a viewers perspective about the saturation axis (or x-axis). In yet another embodiment, the configurable perspective parameters allow for the mapped three-dimensional color space model of the corresponding color space to be both simultaneously rotated (ROT) and tilted (TILT) about a point or axis.

As such, the configurable perspective parameters allow for the manipulation of the mapped three-dimensional color space model of the corresponding color space. As a result, a wide variety of different full global three-dimensional viewing perspectives of the mapped three-dimensional color space model may be accomplished.

In one embodiment, which provides for both the rotation (ROT) and tilt (TILT) of the mapped three-dimensional color space model, a series of perspective calculations are executed to provide for different viewing perspectives of the mapped three-dimensional color space model, in accordance with the different configurable perspective parameters selected. A first Coefficient Function (CF) allows for the calculation of a group of coefficients (f11, f12, f13, f21, f22, f23, f32, f33) based upon the selected configurable perspective parameters, such as rotation angle ('rot') and tilt angle ('tilt'). The group of coefficients (f11, f12, f13, f21, f22, f23, f32, f33) are determined in accordance with the following calculations:

double theta=(float)(rot+90)*3.1415926/180
double phi=(float)tilt*3.1415926/180
double costh=cos(theta)
double sinth=sin(theta)
double cosph cos(phi)
double sinph=sin(phi)
f11=(float)(-sinth)
f12=(float)(-cosph*costh)
f13=(float)(-sinph*costh)
f21=(float)costh
f22=(float)(-cosph*-sinth)
f23=(float)(-sinph*sinth)
f32=(float)sinph
f33=(float)-cosph Wherein, the double theta value function corresponds to the rotation function (ROT), and the 'rot' value corresponds to the selected rotational angle value. Similarly, the double phi value function corresponds to the tilt function (TILT), and the 'tilt' value corresponds to the selected tilt angle value.

Next, a Transformation function (TF) is used in calculating a series of two-dimensional projection coordinates (*x1, *y2) based upon the three-dimensional color point set of coordinates float x, float y, float z, which in the present example would correspond to the (H, S, V) color point coordinates, according to the display window size (cx and cy) and the rotation (ROT) and tilt (TILT) information as expressed in the coefficients (f11, f12, f13, f21, f22, f23, f32, f33). The series of two-dimensional projection coordinates (*x1, *y2) are determined in accordance with the following calculation, for each x, y, z/H, S, V color point coordinate:

float tmp, xe, xx, yy
float fRatio=(float)((2*cx-8)*(1.414/(cx+cy))
float fView=(float)50*2*cx
float fSize=fView*fRatio
tmp=(float)fView/(x*f13+y*f23+z*f33+fSize)
xe=x*f11+y*f21
yy=(float)((float)x*f12+y*f22+z*f32*tmp)
xx=xe*tmp
*y1=(int)yy
*x1=(int)xx Wherein, 'tmp' represents a temporary variable value; 'x', 'y' and 'z' represent the color point coordinates; (cx) and (cy) represent the dimensions of the graphics display area window; and '*x1' and '*y2' represent the two-dimensional projection coordinates corresponding to the selected rotational angle value and selected tilt angle value.

It is understood that the above calculations are merely illustrative of one embodiment of a technique for generating two dimensional projection coordinates (e.g., '*x1' and '*y2') in accordance with one embodiment of manipulation parameters used for manipulating the viewing perspective of a mapped three-dimensional color space model. Further, it is understood that a variety of different manipulation parameters could be use to manipulate the mapped three-dimensional color space model of a corresponding color space. As such, the above calculation is for illustrative purposes and is not meant to limit the present invention to the specific calculations or technique used above for the manipulation of the viewing perspectives of a mapped three-dimensional color space model.

The two-dimensional projection coordinates ('*x1' and '*y2') allow for the manipulation of the mapped three-dimensional color space model in response to the selected rotational angle value and selected tilt angle value. Accordingly, the two-dimensional projection coordinates ('*x1' and '*y2') manipulate the mapped three-dimensional color space model by establishing two-dimensional projection coordinates for each of the color points which have been previously mapped to the three-dimensional color space model.

Accordingly, each color point contained in the mapped three-dimensional color space model is plotted by the perspective program 1008 to the new two-dimensional projection coordinates associated with each particular color point. Therefore, the entire mapped three-dimensional color space model is shifted to the new two-dimensional projection coordinates calculated for each color point. As a result, different perspective views of the mapped three-dimensional color space model are provided. It is understood that this process may be repeated with different perspective parameters in order to obtain differing perspective views of the mapped three-dimensional color space model. Alternately, in the embodiment wherein the mapped three-dimensional color space model has been maintained in a memory device for later display on the corresponding two-dimensional display or graphic user interface (GUI), each color point contained in the mapped three-dimensional color space model maintained in memory is modified (e.g., plotted) to the new two-dimensional projection coordinates associated with each particular color point. Therefore, the entire mapped three-dimensional color space model is shifted in memory to the new two-dimensional projection coordinates calculated for each color point. As a result, different perspective views of the mapped three-dimensional color space model are provided. It is understood that this process may be repeated with different perspective parameters in order to obtain differing perspective views of the mapped three-dimensional color space model.

In another embodiment, the mapped three-dimensional color space model of a corresponding color space may be manipulated in order to provided for a distance perspective, wherein the mapped three-dimensional color space model may be manipulated to appear either closer or further from a user's perspective of the viewing plane or surface of the display.

Transfer metrics code 1010 may be applied to the mapped three-dimensional color space model to convert the color spectrum or scheme associated with the mapped three-dimensional color space model to a display color spectrum or scheme supportable by a display. For instance, in the present embodiment, the color spectrum associated with the HSV mapped three-dimensional color space model may be converted into an RGB color spectrum in order to be displayed onto a standard RGB display. As such the transfer function may be a standard color transfer function which simply converts one color spectrum to another color spectrum Accordingly, provided the mapped three-dimensional color frame model is not currently being displayed on a display (i.e., the mapped three-dimensional color frame model maintained in memory), the mapped three-dimensional color frame model may be displayed on a graphic interface unit (GUI), such as for example a standard computer monitor or display by the mapping program 1006.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of generating a global three-dimensional representation of a color space within a computer generated display environment, the method comprising:

quantizing color elements associated with a color space;

generating a three-dimensional color space frame model corresponding to the color space;

mapping the quantized color elements to the three-dimensional color space frame model; and manipulating the three-dimensional color space frame model based upon perspective parameters to provide different three-dimensional views of the three-dimensional color space frame model.

2. The method of claim 1, further including the step of converting the color spectrum of the three-dimensional color space frame model to a display color scheme supportable by a display.

3. The method of claim 1, wherein each color element is quantized by a configurable quantization factor associated with each color element.

4. The method of claim 1, wherein each quantized color element is defined by a corresponding three-dimensional coordinate or set of three-dimensional coordinates.

5. The method of claim 4, wherein the step of mapping the quantized color elements comprises:

converting the three-dimensional coordinates of each quantized color element into corresponding two-dimensional coordinates for each quantized color element; and mapping the converted quantized color elements to a two-dimensional display.

6. The method of claim 1, wherein the step of manipulating perspective parameters associated with the three-dimensional color space representation comprises:

selecting configurable perspective parameters;

computing reference coefficients based upon the selected configurable perspective parameters; and computing a modified set of coordinates for the manipulation of the three-dimensional color space representation model in accordance with the selected configurable perspective parameters.

7. The method of claim 6, wherein the step of computing further includes plotting the modified set of coordinates to provide different three-dimensional perspective views of the three-dimensional color space representation model.

8. A computer readable medium containing executable instructions which, when executed in a processing system, causes the processing system to perform the steps of a method for generating a global three-dimensional representation of a color space, the method comprising:

quantizing color elements associated with a color space;

generating a three-dimensional color space frame model corresponding to the color space;

mapping the quantized color elements to the three-dimensional color space frame model; and manipulating the three-dimensional color space frame model based upon perspective parameters to provide different three-dimensional views of the three-dimensional color space frame model.

9. The method of claim 8, further including the step of converting the color spectrum of the three-dimensional color space frame model to a display color spectrum supportable by a display.

10. The method of claim 8, wherein each color element is quantized by a configurable quantization factor associated with each color element.

11. The method of claim 8, wherein each quantized color element is defined by a corresponding three-dimensional coordinate or set of three-dimensional coordinates.

12. The method of claim 11, wherein the step of mapping the quantized color elements comprises:

converting the three-dimensional coordinates of each quantized color element into corresponding two-dimensional coordinates for each quantized color element; and mapping the converted quantized color elements to a two-dimensional display.

13. The method of claim 8, wherein the step of manipulating perspective parameters associated with the three-dimensional color space representation comprises:

selecting configurable perspective parameters;

computing reference coefficients based upon the selected configurable perspective parameters; and computing a modified set of coordinates for the manipulation of the three-dimensional color space representation model in accordance with the selected configurable perspective parameters.

14. The method of claim 13, wherein the step of computing further includes plotting the modified set of coordinates to provide different three-dimensional perspective views of the three-dimensional color space representation model.

15. A computer system comprising:

a storage device having stored therein computer instructions including:

quantizing color elements associated with a color space;

generating a three-dimensional color space frame model corresponding to the color space;

mapping the quantized color elements to the three-dimensional color space frame model; and manipulating the three-dimensional color space frame model based upon perspective parameters to provide different three-dimensional views of the three-dimensional color space frame model; and a processor coupled to the storage device for executing the computer instructions.

16. The computer system of claim 15 wherein the instructions further comprise converting the color spectrum of the three-dimensional color space frame model to a display color scheme supportable by a display.

17. The computer system of claim 15 wherein each color element is quantized by a configurable quantization factor associated with each color element.

18. The computer system of claim 15 wherein each quantized color element is defined by a corresponding three-dimensional coordinate or set of three-dimensional coordinates.

19. The computer system of claim 18, wherein mapping the quantized color elements comprises:

converting the three-dimensional coordinates or each quantized color element into corresponding two-dimensional coordinates for each quantized color element; and mapping the converted quantized color elements to a two-dimensional display.

20. The computer system of claim 15, wherein manipulating perspective parameters associated with the three-dimensional color space representation comprises:

selecting configurable perspective parameters;

computing reference coefficients based upon the selected configurable perspective parameters; and computing a modified set of coordinates for the manipulation of the three-dimensional color space representation model in accordance with the selected configurable perspective parameters.

\* \* \* \* \*